United States Patent [19]

Kato

[11] Patent Number: 5,042,307
[45] Date of Patent: Aug. 27, 1991

[54] AMPLIFYING COMPENSATION CIRCUIT FOR SEMICONDUCTOR

[75] Inventor: Kazuyuki Kato, Kanagawa, Japan

[73] Assignee: Fuji Electric Co., Ltd., Kanagawa, Japan

[21] Appl. No.: 553,339

[22] Filed: Jul. 17, 1990

[30] Foreign Application Priority Data

Jul. 19, 1989 [JP] Japan .................................. 1-186960

[51] Int. Cl.$^5$ ............................................. G01L 19/04
[52] U.S. Cl. ........................................ 73/708; 73/721; 73/727; 73/766
[58] Field of Search ................. 73/708, 720, 721, 726, 73/727, 766; 338/4, 3

[56] References Cited

U.S. PATENT DOCUMENTS 4,337,665  7/1982  Sato et al. ............................... 73/766
4,798,093  1/1989  Kenoun .................................. 73/708

FOREIGN PATENT DOCUMENTS 59-217375  12/1984  Japan .

Primary Examiner—Donald O. Woodiel
Attorney, Agent, or Firm—Finnegan, Henderson Farabow, Garrett and Dunner

[57] ABSTRACT

A pressure sensor circuit has a bridge circuit of strain gauges formed on a silicon diaphragm with two output terminals. The difference in the voltage between the two output terminals is dependent on the pressure applied to the strain gauges. A differential amplifier circuit having an operational amplifier and a feedback circuit amplifies the difference between the two output terminals. A temperature dependent resistor in the feedback circuit provides temperature compensation. An adjustable resistor adjusts the sensitivity of the pressor sensor circuit. Temperature dependent resistors connected between the operational amplifier and reference voltages compensate for zero point temperature fluctuations, and adjustable resistors connected between the operational amplifier and the reference voltages adjust the zero point.

10 Claims, 3 Drawing Sheets

AMPLIFYING COMPENSATION CIRCUIT FOR SEMICONDUCTOR

BACKGROUND OF THE INVENTION

1. Field of the Invention

The invention is an amplifying compensation circuit for a semiconductor pressure sensor. More particularly, the invention relates to an amplifying compensation circuit which realizes a high precision semiconductor pressure sensor with a small number of circuit elements.

2. Description of the Prior Art

A semiconductor pressure sensor generates a voltage or a set of voltages which are dependent on the pressure applied to the sensor. Circuitry is provided to amplify the generated voltage and to adjust the generated voltage.

The voltage generated by a semiconductor pressure sensor may vary with the temperature. Therefore, circuitry associated with the semiconductor pressure sensor must compensate for temperature induced voltage changes to achieve accurate pressure readings.

Different semiconductor pressure sensors will have slightly different voltage characteristics depending on the manufacturing attributes. Therefore, the sensitivity of the pressure sensor is adjusted.

The zero point is the semiconductor pressure sensor output voltage when no external pressure or only a background pressure is applied to the pressure sensor. The zero point may vary with the temperature. Therefore, circuitry should be provided to compensate for the temperature induced changes in the zero point.

The setting of the zero point should be adjustable to allow the pressure sensor to operate over a wide range of conditions.

FIG. 4 shows one example of a circuit for performing the two compensations and two adjustments discussed above. The output voltage of a bridge 100 made up of strain gauges 101-104 is dependent on the pressure applied to the strain gauges 101-104. The output voltage is amplified by a front stage differential amplifier comprising operational amplifiers 201 and 202 and resistors 1-3 and is then amplified by a rear stage differential amplifier comprising an operational amplifier 203 and resistors 4-7 and 52. The output voltage thus amplified is provided as an output $V_{out}$.

Resistor 52 compensates for temperature induced voltage changes. Resistor 52 is a diffusion resistor which has a positive temperature dependency. Resistor 52 gives a positive temperature dependency to the degree of amplification of the rear stage differential amplifier and, therefore, compensates the negative temperature dependency of the strain gauge bridge. In the compensation circuit, the resistor 7 serves as an adjustment resistor.

Sensitivity adjustment is carried out by adjusting the resistance of the resistor 1 until the amplification of the circuit is a predetermined value.

The output voltage Vd of an operational amplifier 204 is added to the sensor output voltage $V_{out}$ of the rear stage differential amplifier including the operational amplifier 203. The potential and temperature characteristics of the output voltage Vd of the amplifier 204 are selected to perform zero point adjustment and zero point temperature dependent change compensation.

In FIG. 4, resistors 50 and 51 have temperature dependent resistance. The resistances of resistors 10 and 11, respectively connected in parallel with resistors 50 and 51, are selected to insure a predetermined temperature characteristic of the output voltage Vd of the operational amplifier 204. As is apparent from the above description, the zero point adjustment and the zero point temperature characteristic compensation are carried out with the aid of the operational amplifier 204 and its peripheral resistors 8-13, 50, and 51.

With amplifying compensation, the adjustments are carried out in the order of: sensitivity temperature characteristic compensation; sensitivity adjustment; zero point temperature characteristic compensation; and zero point adjustment. The adjustments are separately performed. Hence, in the adjustments, high adjustment accuracy can be obtained relatively easily.

However, the number of elements in the circuit of FIG. 4 is large; four operational amplifiers, thirteen resistors, and three temperature dependent resistors are used. The large number of elements will obstruct miniaturization of the sensor, and will obstruct integration of all the elements of the sensor on a single silicon chip.

FIG. 5 shows another example of an amplifying compensation circuit having four compensation and adjustment functions. The output voltage of a bridge 100 consisting of strain gauges 101-104 is amplified by a differential amplifier made up of an operational amplifier 205 and resistors 15-18.

Temperature dependent voltage changes are compensated for by means of resistors 14 and 53 connected between the positive terminal of the power source and the strain gauge bridge. The resistor 53 has a negative temperature dependency. Resistor 53 may be a thermistor. The arrangement of resistors 14 and 53 gives a positive temperature dependency to the potential at the connecting point A of the strain gauges. The positive drive voltage developed between the supply voltage drive terminals of the bridge 100 compensates the negative temperature dependency of the pressure sensitivity of the strain gauges 101-104.

The resistance of the resistor 18 is selected to set the amplification to a predetermined value to adjust the sensitivity of the sensor.

Zero point temperature characteristic compensation is carried out by setting the resistance of the resistor 17 to compensate the temperature dependency of the zero point of the bridge 100 output.

Zero point adjustment is performed by adjusting the resistances of resistors 19 and 20 which are connected to the resistor 17 of the differential amplifier.

When the resistance of the resistor 17 is high, the positive temperature dependency of the bridge output in-phase potential is outputted unchanged, thus, giving a positive temperature dependency to the output $V_{out}$ of the circuit. As the resistance of the resistor 17 decreases, the potential at a connecting point B of the resistors 19 and 20, which do not have a temperature dependency, will affect the potential at the non-inversion input terminal of the differential amplifier 205, thus, making the temperature dependency of the sensor output $V_{out}$ more negative.

In the circuit of FIG. 5, the number of elements is not so large; one operational amplifier, seven resistors, and one temperature dependent resistor are used. However, the sensitivity adjustment, the zero point adjustment, and the zero point temperature characteristic are not performed separately. Without separation, it is difficult to perform the adjustments with high accuracy. Furthermore, the zero point temperature characteristic compensation range is narrow, because the range is limited by the temperature dependency of the bridge output in-phase voltage. Hence, compensation cannot be achieved if the zero point temperature dependency of the bridge output fluctuates greatly. In addition, because of the voltage drop across the parallel circuit of the resistors 14 and 53, the bridge drive voltage becomes lower than the sensor supply voltage decreasing the bridge output signal.

Japanese Patent Application (OPI) No. 217375/1984 (the term "OPI" as used herein means an "unexamined published application") discloses a circuit similar to the above-described circuit. The circuit disclosed has a smaller number of components than the circuit shown in FIG. 4. However, it is disadvantageous in that the zero point temperature compensation range is narrow, and the characteristic compensations are not separated from one another.

SUMMARY OF THE INVENTION

Accordingly, an object of this invention is to solve the above-described problems Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

The foregoing objects of the invention have been achieved by the provision of a semiconductor pressure sensor having first and second terminals connected respectively to first and second potentials, and pressure sensing means interconnected with the first and second terminals for generating first and second voltages. The difference of the first and second voltages is dependent on at least one pressure to be sensed. A voltage follower circuit receives the first voltage and changes the impedance of the first voltage. Amplifier means amplify the difference between the first and second voltages, and the amplifier means comprise an operational amplifier with first and second inputs and a feedback circuit with a temperature dependent resistor. Means for adjusting the sensitivity of the pressure sensor comprise a resistor with adjustable resistance connected between the pressure sensing means and the first input of the operational amplifier. Means for compensating for temperature induced fluctuations in the zero point of the pressure sensor comprise at least one temperature dependent resistor connected between the first input of the operational amplifier and the first terminal, and at least one temperature dependent resistor connected between the first input of the operational amplifier and the second terminal. Means for adjusting the zero point comprise at least one resistor with an adjustable resistance connected between the first input of the operational amplifier and the first terminal, and at least one resistor with an adjustable resistance connected between the first input of the operational amplifier and the second terminal.

The voltage follower circuit comprises one operational amplifier. One output voltage, in the form of low output impedance is applied directly to the differential amplifier circuit. The voltage follower circuit increases the output impedance of the other output voltage before the output voltage is applied to the operational amplifier. Therefore, the voltage follower circuit prevents the interference in characteristic between the differential amplifier circuit and the bridge circuit.

In the differential amplifier circuit, comprising at least one operational amplifier, sensitivity adjustments are carried out by adjusting the resistance of an input resistor. Sensitivity temperature compensation is performed with the aid of feedback resistors where at least one resistor has a positive temperature dependency. Zero point adjustment is carried out with the resistors connected between the inversion input terminal and the positive and negative power source terminals. Zero point temperature compensation is performed with the aid of the resistors connected between the inversion input terminal and the positive and negative power source terminals where two resistors have a high temperature dependency.

The sensitivity temperature compensation the sensitivity adjustment, the zero point adjustment, and the zero point temperature compensation are carried out independently.

DESCRIPTION OF THE DRAWINGS

The accompanying drawings, which are incorporated in and constitute a part of this specification illustrate embodiments of the invention and, together with the description, serve to explain the principles of the invention.

In the figures, like references numbers refer to similar or like parts.

DETAILED DESCRIPTION OF THE PREFERRED EMBODIMENTS

In the figures, resistors 50–58 are temperature dependent resistors.

Figure 1:
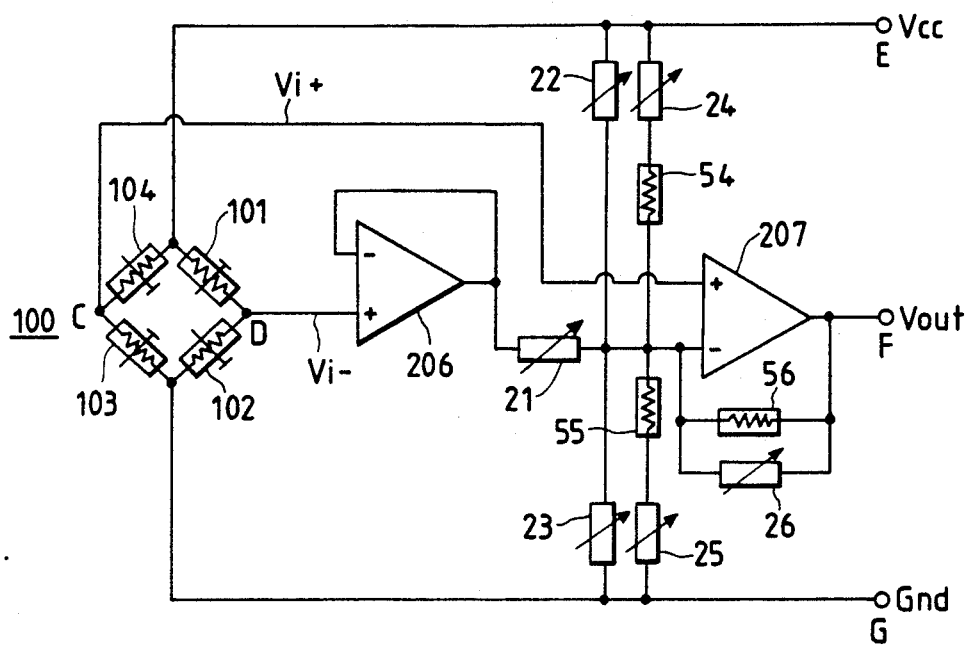
FIG. 1 is a circuit diagram showing a first embodiment of the pressure sensor.

FIG. 1 shows a first embodiment of the semiconductor pressure sensor circuit. Strain gauges 101 through 104 form a bridge 100 on a silicon diaphragm. Strain gauge 101 through 104 are positioned on the diaphragm so that a voltage signal is developed across differential output terminals C and D of the bridge 100 in response to the application of pressure.

Terminal D is connected to the non-inversion input terminal of an operational amplifier 206. The inversion input terminal of operational amplifier 206 is connected to its output terminal, thus forming a voltage follower circuit.

The output terminal of the operational amplifier 206 is connected through an adjustable resistor 21 to the inversion input terminal of an operational amplifier 207. The non-inversion input terminal of the differential amplifier 207 is connected to terminal C of the bridge 100. The inversion input terminal of the operational amplifier 207 is also connected through a resistor 22 to a power source terminal E. An adjustable resistor 24 and a temperature dependent resistor 54, connected in series, are connected between the inversion input terminal of the operational amplifier 207 and the power source terminal E. The adjustable resistor 22 is, thus, shunted by the two resistors 24 and 54 connected in series. The inversion input terminal of the operational amplifier 207 is further connected through a resistor 23 to a ground terminal G. The resistor 23 is shunted by a series circuit of an adjustable resistor 25 and a temperature dependent resistor 55.

A parallel circuit of a resistor 56 having a positive temperature dependency and an adjustable resistor 26 is connected between the inversion input terminal of operational amplifier 207 and the output terminal of operational amplifier 207. The output terminal of operational amplifier 207 is the output terminal F of the semiconductor pressure sensor. A sensor output voltage $V_{out}$ is provided at terminal F.

The operation of the semiconductor pressure sensor will now be described. When the silicon diaphragm is pressured, the potential $Vi+$ at the output terminal C of the bridge 100 is increased, while the potential $Vi-$ at the output terminal D is decreased.

Output voltages $Vi-$ is applied to the voltage follower circuit comprising operational amplifier 206. The output voltage $Vi+$, in the form of high output impedance, is applied directly to the operational amplifier 207. The voltage follower circuit decreases the output impedance of the output voltage $Vi-$ before the output voltage $Vi-$ is applied to the operational amplifier 207. Therefore, the voltage follower circuit prevents the interference in characteristic between the differential amplifier circuit comprising operational amplifier 207 and the bridge 100.

The difference between the potentials $Vi-$ and $Vi+$ is amplified by the operational amplifier 207 with the aid of the peripheral resistors.

Resistor 56 is connected, together with resistor 26 as a parallel circuit of feedback resistors between the output terminal and the inversion input terminal of the operational amplifier 207. The amplification of the differential amplifier 207 has a positive temperature dependency because of the temperature dependent resistor 56. The positive temperature dependency is utilized to compensate the negative temperature dependency of the bridge 100.

The amplification of operational amplifier 207 and, accordingly, the sensitivity may be adjusted by changing the resistance of the resistor 21.

The series circuit of the adjustable resistor 24 and temperature dependent resistor 54 and the series circuit of the adjustable resistor 25 and temperature dependent resistor 55 are provided for zero point temperature characteristic compensation. Resistors 54 and 55 both have a positive temperature dependency. Current flows from the power source terminal E through the series circuit of the resistors 24 and 54 and the parallel circuit of the feedback resistors 26 and 56 to the output terminal F of the operational amplifier 207 decreasing the sensor output voltage $V_{out}$. The decreasing current has a negative temperature dependency being affected by the resistor 54, thus giving a positive temperature dependency to the sensor output voltage $V_{out}$. Conversely, current flows from the output terminal F of the operational amplifier 207 through the parallel circuit of the feedback resistors 26 and 56 and the series circuit of the resistors 55 and 25 to a ground terminal G increasing the sensor output voltage $V_{out}$. This current has a negative temperature dependency being affected by the resistor 55, thus giving a negative temperature dependency to the sensor output voltage $V_{out}$. The temperature dependencies of the increasing and decreasing currents are adjusted to compensate the zero point temperature characteristic of the sensor output voltage $V_{out}$.

The adjustable resistors 22 and 23 are provided for zero point adjustment. Current flows from the power source terminal E through the resistor 22 and the parallel circuit of the feedback resistors 26 and 56 to the output terminal F of the operational amplifier 207, thus decreasing the sensor output voltage $V_{out}$. Conversely, current flows from the output terminal F of the operational amplifier 207 through the parallel circuit of the feedback resistors 26 and 56 and the resistor 23 to the ground terminal G, thus increasing the sensor output voltage $V_{out}$. The zero point of the sensor output voltage $V_{out}$ is obtained by adjusting the resistances of the resistors 22 and 23.

The sensor output $V_{out}$ can be represented by the following equation (1):

$$V_{out} = Vi+ + (Rx/R21)(Vi+ - Vi-) - \qquad (1)$$
$$(Vcc - Vi+)(Rx/R22) + Vi + (Rx/R23) -$$
$$(Vcc - Vi+)\{Rx/(R24 + R54)\} + Vi + \{Rx/(R25 + R55)\}$$
$$\text{where } Rx = R56 \times R26/(R56 + R26) \qquad (2)$$

and Vcc is the supply voltage

In equation (1): the second term of the right side is the bridge 100 output amplified; the third term is the current flowing in the resistor 22; the fourth term is the current flow in the resistor 23; the fifth term is the current flowing in the resistors 24 and 54; and the sixth term is the current flowing in the resistor 25 and 55. In other words, the second term of the right side is for sensitivity adjustment, and sensitivity temperature characteristic (compensation) adjustment; the third and fourth terms are for zero point adjustment; and the fifth and sixth terms are for zero point temperature (compensation) adjustment. As is apparent from the above description, the circuit elements concerning sensitivity and the circuit elements concerning zero point are separate. Therefore, the sensitivity adjustment and the sensitivity temperature compensation are independent of the zero point adjustment and the zero point temperature characteristic compensation. Therefore, high adjustment accuracy can be easily obtained.

Figure 2:
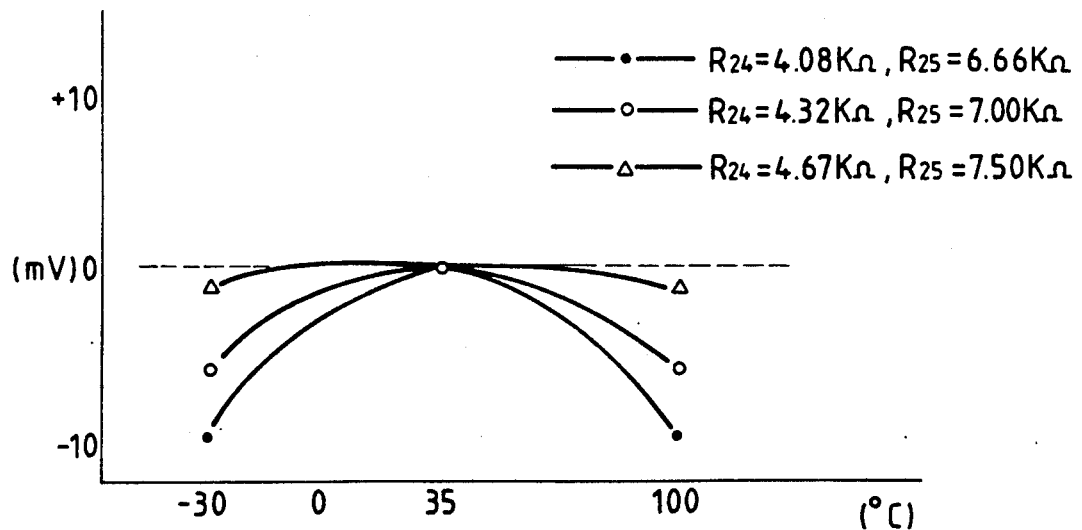
FIG. 2 is a graphical representation indicating temperature gradient compensated temperature characteristics with the resistances of resistors 24 and 25 in FIG. 1.

In general, the term "zero point temperature characteristic compensation" is intended to mean the compensation of a temperature gradient. However, with this circuit, the bend of the temperature character can also be compensated. FIG. 2 shows temperature gradient compensated temperature characteristics for different resistances of the resistors 24 and 25. As is apparent from FIG. 2, a curved temperature characteristic can be changed into a flat temperature characteristic by changing the resistances of resistors 24 and 25 in a balancing mode.

A curved sensitivity temperature characteristic can also be changed into a flat sensitivity temperature characteristic by changing the temperature characteristic of resistor 56. For instance, in the case where resistor 56 is formed by diffusion, similar to the case of the strain gauges, the temperature characteristic of the resistor 56 can be changed by adjusting the dosage of impurities. Therefore, the curved sensitivity temperature characteristic of the sensor output $V_{out}$ can be changed into a flat one.

Figure 3:
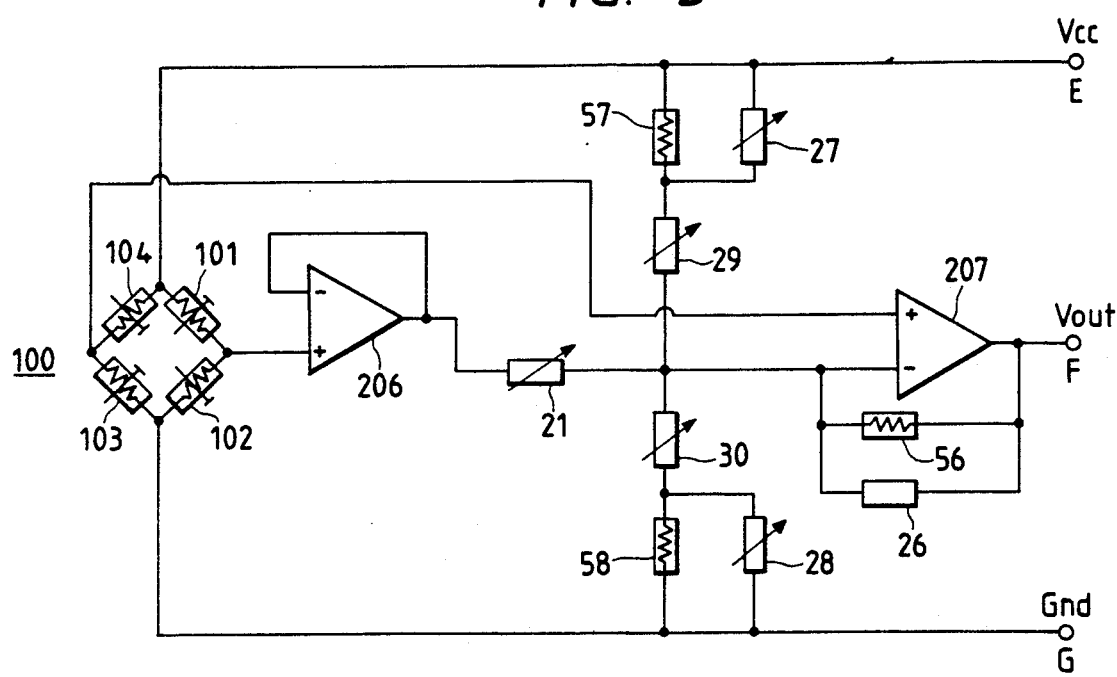
FIG. 3 is a circuit diagram showing a second embodiment of the pressure sensor.

FIG. 3 shows a second embodiment of the invention, which has the same effects as the first embodiment shown in FIG. 1. In the second embodiment, the zero point adjustment and the zero point temperature characteristic compensation are carried out by setting the resistances of resistors 27 through 30 to suitable values.

Figure 4:
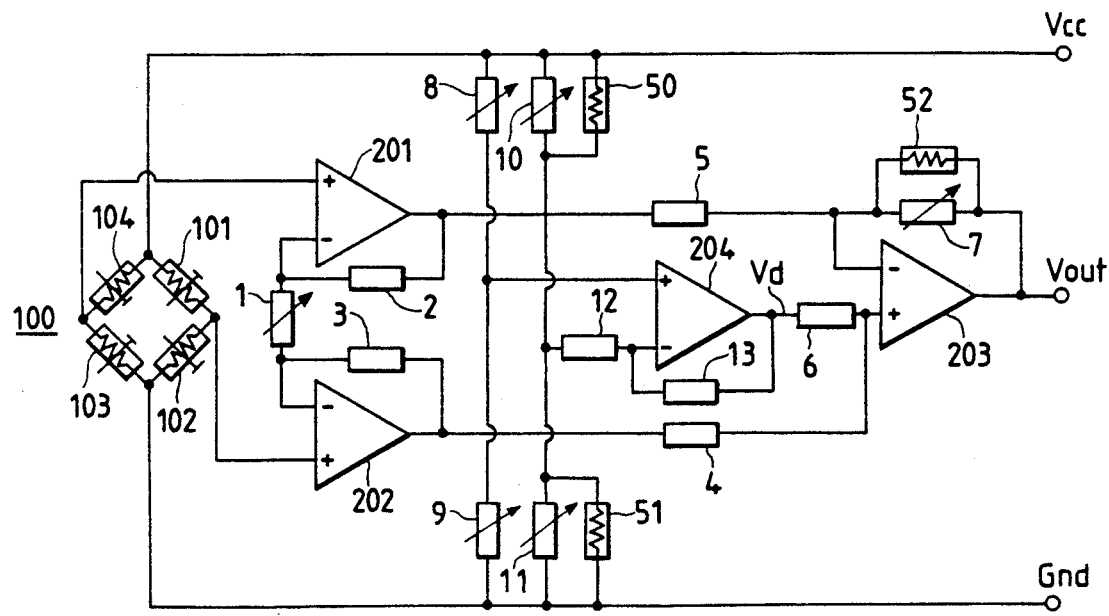
FIGS. 4 and 5 are circuit diagrams showing different examples of conventional amplifying compensation circuits in a pressure sensor.
Figure 5:
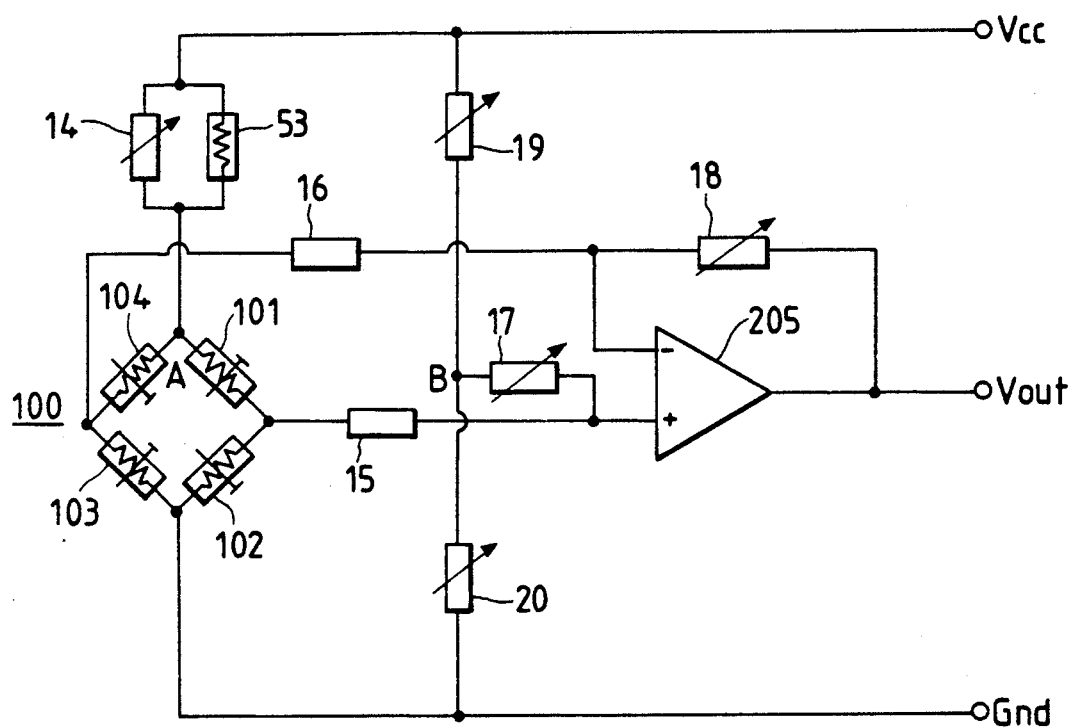

Hence, the semiconductor pressure sensor has the following effects or merits:

(1) In the first embodiment of the invention shown in FIG. 1, the amplifying compensation circuit is made up of two operational amplifiers, six resistors, and three temperature dependent resistors: that is, the number of elements forming the amplifying compensation circuit is about half the number of elements forming the amplifying compensation circuit in the conventional pressure sensor shown in FIG. 4. Accordingly, miniaturization of the sensor can be realized with ease. In addition, all the circuit elements can be formed on a single chip according to a method of forming the temperature dependent elements on the chip by diffusion, and employing film resistors.

(2) The sensitivity adjustment and the sensitivity temperature compensation can be performed independently of the zero point adjustment and the zero point temperature characteristic compensation. Therefore, the adjustments and compensations can be achieved with high accuracy.

(3) By selecting the resistances concerning the zero point temperature characteristic, the bend of the latter can be compensated. Hence, the sensor operates with high accuracy over a wide temperature range.

The foregoing description of preferred embodiments of the invention has been presented for purposes of illustration and description. It is not intended to be exhaustive or to limit the invention to the precise form disclosed, and obviously many modifications and variations are possible in light of the above teachings or may be acquired from practice of the invention. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A pressure sensor circuit, comprising:
first and second terminals connected respectively to first and second potentials;
means for sensing a pressure and generating first and second voltages interconnected with the first and second terminals, the difference of the first and second voltages being dependent on at least one pressure to be sensed;
means for converting impedance comprising a voltage follower circuit which receives the first voltage;
means for amplifying the difference between the first and second voltages comprising an operational amplifier with first and second inputs and a feedback circuit with a temperature dependent resistor;
means for adjusting the sensitivity of the pressure sensor circuit comprising a resistor with adjustable resistance connected between the pressure sensing means and the first input of the operational amplifier;
means for compensating for temperature induced fluctuations in the zero point of the pressure sensor circuit comprising at least one temperature dependent resistor connected between the first input of the operational amplifier and the first terminal; and
means for adjusting the zero point of the pressure sensor circuit comprising at least one resistor with an adjustable resistance connected between the first input of the operational amplifier and the first terminal.

2. A pressure sensor circuit as claimed in claim 1, wherein the first input of the operational amplifier is the inversion input.

3. A pressure sensor circuit as claimed in claim 2, wherein the pressure sensor means is a bridge circuit having strain gauges formed on a silicon diaphragm.

4. A pressure sensor circuit as claimed in claim 3, wherein the feedback circuit further comprises a resistor with adjustable resistance connected in parallel to the temperature dependent resistor.

5. A pressure sensor circuit as claimed in claim 4, wherein the means for compensating for the temperature induced fluctuations further comprises a resistor with adjustable resistance connected in series with the at least one temperature dependent resistor.

6. A pressure sensor circuit, comprising:
first and second terminals connected respectively to first and second potentials;
means for sensing a pressure and generating first and second voltages interconnected with the first and second terminals, the difference of the first and second voltages being dependent on at least one pressure to be sensed;
means for converting impedance comprising a voltage follower circuit which receives the first voltage;
means for amplifying the difference between the first and second voltages comprising an operational amplifier with first and second inputs and a feedback circuit with a temperature dependent resistor;
means for adjusting the sensitivity of the pressure sensor circuit comprising a resistor with adjustable resistance connected between the pressure sensing means and the first input of the operational amplifier;
means for compensating for temperature induced fluctuations in the zero point of the pressure sensor circuit comprising at least one temperature dependent resistor connected between the first input of the operational amplifier and the first terminal, and at least one temperature dependent resistor connected between the first input of the operational amplifier and the second terminal; and
means for adjusting the zero point of the pressure sensor circuit comprising at least one resistor with an adjustable resistance connected between the first input of the operational amplifier and the first terminal, and at least one resistor with an adjustable resistance connected between the first input of the operational amplifier and the second terminal.

7. A pressure sensor circuit as claimed in claim 6, wherein the first input of the operational amplifier is the inversion input.

8. A pressure sensor circuit as claimed in claim 7, wherein the pressure sensor means is a bridge circuit having strain gauges formed on a silicon diaphragm.

9. A pressure sensor circuit as claimed in claim 8, wherein the feedback circuit further comprises a resistor with adjustable resistance connected in parallel to the temperature dependent resistor.

10. A pressure sensor circuit as claimed in claim 9, wherein the means for compensating for the temperature induced fluctuations further comprises a resistor with adjustable resistance connected in series with the at least one temperature dependent resistor connected between the first input of the operational amplifier and the first terminal, and a resistor with adjustable resistance connected in series with the at least one temperature dependent resistor connected between the first input of the operational amplifier and the second terminal.

* * * * *

UNITED STATES PATENT AND TRADEMARK OFFICE
CERTIFICATE OF CORRECTION

PATENT NO. : 5,042,307
DATED : August 27, 1991
INVENTOR(S) : Kazuyuki Kato

It is certified that error appears in the above-identified patent and that said Letters Patent is hereby corrected as shown below:

Title page:

Item (54) and column 1, after "SEMICONDUCTOR" insert --PRESSURE SENSOR--.

Abstract, line 10, change "pressor" to --pressure--.

Signed and Sealed this

Twenty-third Day of March, 1993

Attest:

STEPHEN G. KUNIN

*Attesting Officer*  *Acting Commissioner of Patents and Trademarks*